US006755503B2

(12) United States Patent
von Niederhausern et al.

(10) Patent No.: US 6,755,503 B2
(45) Date of Patent: Jun. 29, 2004

(54) HOUSEKEEPING STATION

(75) Inventors: Andreas von Niederhausern, Riggisberg (CH); Bruno Erni, Bern (CH)

(73) Assignee: Mailroom Technology, Inc., Shelton, CT (US)

( * ) Notice: Subject to any disclaimer, the term of this patent is extended or adjusted under 35 U.S.C. 154(b) by 0 days.

(21) Appl. No.: 10/081,271

(22) Filed: Feb. 21, 2002

(65) Prior Publication Data

US 2002/0140766 A1 Oct. 3, 2002

Related U.S. Application Data

(60) Provisional application No. 60/270,796, filed on Feb. 23, 2001, provisional application No. 60/277,806, filed on Mar. 22, 2001, provisional application No. 60/277,841, filed on Mar. 22, 2001, provisional application No. 60/277,873, filed on Mar. 22, 2001, provisional application No. 60/277,931, filed on Mar. 22, 2001, provisional application No. 60/277,946, filed on Mar. 22, 2001, and provisional application No. 60/338,892, filed on Nov. 5, 2001.

(51) Int. Cl.[7] .................................................. B41J 2/165
(52) U.S. Cl. .............................. 347/33; 347/29; 347/32; 347/35
(58) Field of Search ............................ 347/33, 32, 29, 347/35, 22

(56) References Cited

U.S. PATENT DOCUMENTS

| 5,278,584 | A | | 1/1994 | Keefe et al. ............ 346/140 R |
| 5,541,629 | A | | 7/1996 | Saunders et al. ............. 347/12 |
| 5,563,642 | A | | 10/1996 | Keefe et al. ................... 347/84 |
| 5,619,236 | A | | 4/1997 | Keefe et al. ................... 347/84 |
| 5,638,101 | A | | 6/1997 | Keefe et al. ................... 347/65 |
| 5,644,345 | A | * | 7/1997 | Toniolo ........................ 347/32 |
| 5,648,804 | A | | 7/1997 | Keefe et al. ................... 347/47 |
| 5,648,806 | A | | 7/1997 | Steinfield et al. ............. 347/87 |
| 5,650,811 | A | | 7/1997 | Seccombe et al. ............ 347/85 |
| 5,896,143 | A | * | 4/1999 | Matsui et al. ................. 347/24 |
| 5,896,145 | A | | 4/1999 | Osborne et al. .............. 347/33 |
| 5,914,734 | A | | 6/1999 | Rotering et al. .............. 347/28 |
| 5,946,009 | A | * | 8/1999 | Youn ............................ 347/32 |
| 6,318,837 | B1 | | 11/2001 | Barinaga ....................... 347/33 |
| 6,561,619 | B1 | * | 5/2003 | Shibata et al. ................ 347/33 |

FOREIGN PATENT DOCUMENTS

| EP | 0 604 068 A2 | * | 6/1994 | ................... 347/32 |
| JP | 408207293 A | * | 8/1996 | ................... 347/33 |

* cited by examiner

Primary Examiner—Shih-Wen Hsieh
(74) Attorney, Agent, or Firm—Perman & Green, LLP

(57) ABSTRACT

An inkjet printhead cleaning station for cleaning a movable inkjet printhead assembly comprises; a housing structure for the cleaning station; a wiper element having a free end portion; a pivotable carriage assembly secured to the wiper element and adapted to rotate the wiper and bend the free end portion of the wiper element; and a hook element positioned on the movable inkjet printhead assembly and adapted to engage the pivotable carriage and thereby rotate and bend the free end position of the wiper against the housing thereby removing ink from the wiper.

7 Claims, 11 Drawing Sheets

HOUSEKEEPING STATION

CROSS-REFERENCE TO RELATED APPLICATIONS

This application claims priority of the following U.S. provisional patent applications: serial No. 60/270,796 filed on Feb. 23, 2001, serial No. 60/277,806 filed on Mar. 22, 2001, serial No. 60/277,841 filed on Mar. 22, 2001, serial No. 60/277,873 filed on Mar. 22, 2001, serial No. 60/277,931 filed on Mar. 22, 2001, serial No. 60/277,946 filed on Mar. 22, 2001 and serial No. 60/338,892 filed Nov. 5, 2001.

BACKGROUND OF THE INVENTION

1. Field of the Invention

The present invention relates generally to an ink jet printing apparatus, and more particularly, to a cleaning or housekeeping system within an ink jet printing apparatus which system employs available wiper blades to clean the ink jet printheads.

2. Brief Description of Prior Developments

Basically an ink jet printing apparatus ejects ink from an opening such as a nozzle or an array of nozzles in the form of an image onto a recording medium. The ink can be ejected by an electronic system (i.e. piezoelectric) using a piezoelectric element and an oscillation pressure or one can eject ink as a thermal ink jet system, i.e. using pressure generated as a result of forming and growing bubbles by heat. In either case, by using either method, a high precision image on a recording material can be obtained. Ink jet printing has been used as the means for printing in many different and varied types of apparatus including general printers, facsimile machines, plotters, and postage meters.

Ink jet printing systems generally are of two types, i.e. continuous stream and drop-on-demand. In continuous stream ink jet systems, ink is emitted in a continuous stream under pressure through at least one orifice or nozzle. The stream is breaks up into droplets at a fixed distance from the orifice. At the break-up point, the droplets are charged in accordance with digital data signals and passed through an electrostatic field, which adjusts the trajectory of each droplet in order to direct it to a gutter for recirculation or to a specific location on a recording medium. In drop-on-demand systems, a droplet is expelled from an orifice directly to a position on a recording medium in accordance with information from digital data signals. A droplet is not formed or expelled unless it is to be placed on the recording medium.

There are two types of drop-on-demand ink jet systems. One type of drop-on-demand system has as its major components an ink filled channel or passageway having a nozzle or an array of nozzles on one end and a piezoelectric transducer near the other end to produce pressure pulses. Another type of drop-on-demand system is known as thermal ink jet, or bubble jet, and produces high velocity droplets and allows very close spacing of nozzles. The major components of this type of drop-on-demand system are an ink filled channel having a nozzle or an array of nozzles on one end and a heat-generating resistor near each nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. The droplet ejection system based upon thermally generated bubbles is commonly referred to as the "bubble jet" system.

In all of the various type of ink jet printing systems as described above, the ink jet printing apparatus employs a cleaning or housekeeping system which is used to clean the ink jet printheads thereby allowing the printheads to function correctly and print at the highest levels of print quality as possible in an ink jet printing system. For example, if not cleaned properly, ink left on the printhead or within the nozzles in the printhead, will dry, especially when the printhead is not in operation, thereby clogging the nozzles and seriously effecting print quality in a negative way.

Generally speaking, a cleaning station sometimes called a housekeeping or service station is used in combination with an inkjet printing system for cleaning the printheads. In the cleaning operation, the printheads are moved over the housekeeping station for maintenance purposes. These housekeeping stations generally include a capping system, which is basically a cap, or caps used with an effective seal to substantially seal the printhead nozzles from contaminants and drying during periods of storage or non-printing. The nozzles in a printhead can be cleaned during operation by sending a number of drops of ink through each of the nozzles by a procedure known as "spitting". In this procedure the waste ink is collected in a "spittoon", i.e. a reservoir in the housekeeping station. In addition to the described spitting and capping procedures for cleaning ink jet printheads, elastomeric wiper elements are also used to wipe the printhead surface to remove ink residue, dust or other debris that has collected on the printhead. The wiping action is usually achieved through relative notion of the printhead and wiper, by, for example, moving the printhead across wiper elements.

Although, there are numerous different types and structures for ink jet printhead cleaning stations, there is constantly a need to improve the overall efficiency of such cleaning systems. Generally, there is a need for improved cleaning systems for use in an ink jet printing apparatus within a postage meter. Specifically there is a need to improve such cleaning systems. One way to improve these cleaning systems in accordance with the present invention is to include wiper elements which wipe ink residue and ink solvent from the printhead more quickly without impacting the throughput rating of the printing unit.

SUMMARY OF THE INVENTION

In accordance with the features of one embodiment of the present invention there is provided an inkjet printhead cleaning station comprising in a single housing structure; a first area in which ink is adapted to be forced through nozzles positioned on an inkjet head; a second area including a plurality of wipers adapted to wipe an inkjet head, each of the wipers being mounted on a carriage assembly that is adapted to pivot thereby rotating the wipers and thereby causing edges of the wipers to bend on the housekeeping and scrape off excess ink on the wipers; a third area in which ink is forced through the nozzle for a second time; and a fourth area of the cleaning station in which a cap is positioned on the head to seal nozzles in the printhead.

In accordance with the features of the present invention there is provided another embodiment of the present invention wherein an inkjet head cleaning station for cleaning a movable inkjet printhead assembly comprises a housing structure; a wiper element having a free end portion; a pivotable carriage assembly secured to the wiper element and adapted to rotate the wiper and bend the free end portion of the wiper elements so that ink on the wiper is scraped off by the housing and a book element positioned on the movable inkjet printhead assembly and adapted to engage the pivotable carriage and thereby rotate and bend the free end portion of the wiper against the housing thereby removing ink form the wiper. After rotating the wipers past the bending and scraping obstacle the wipers regain its straight shape and ink is flicked off.

BRIEF DESCRIPTION OF THE DRAWINGS

The above mentioned features of this invention and the manner of attaining them will become apparent, and the invention itself will be best understood by reference to the following description of the embodiments of the invention in conjunction with the accompanying drawings, wherein.

DETAILED DESCRIPTION OF THE PREFERRED EMBODIMENTS

Figure 1A:
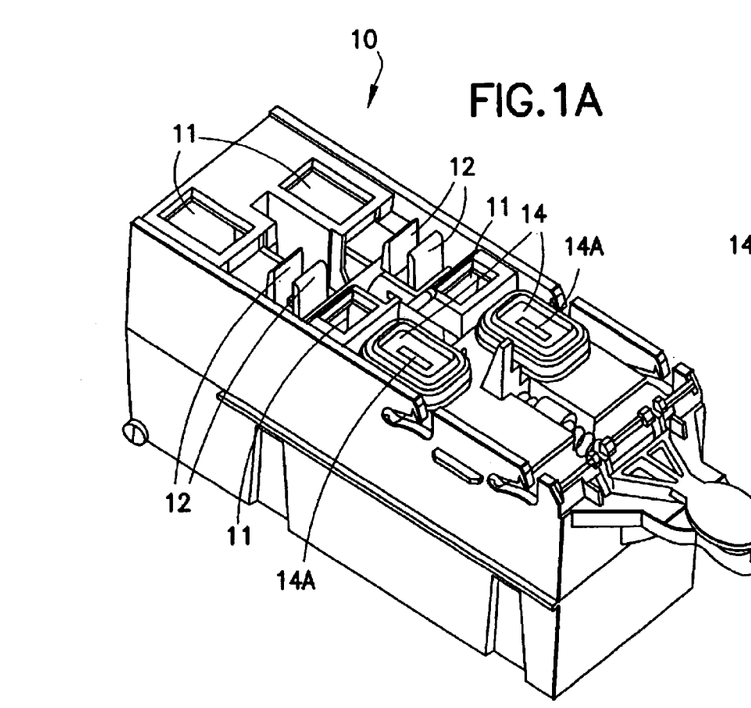
FIGS. 1A and 1B are isometric views of a housing of a cleaning station in accordance with the features of the present invention.
Figure 1B:
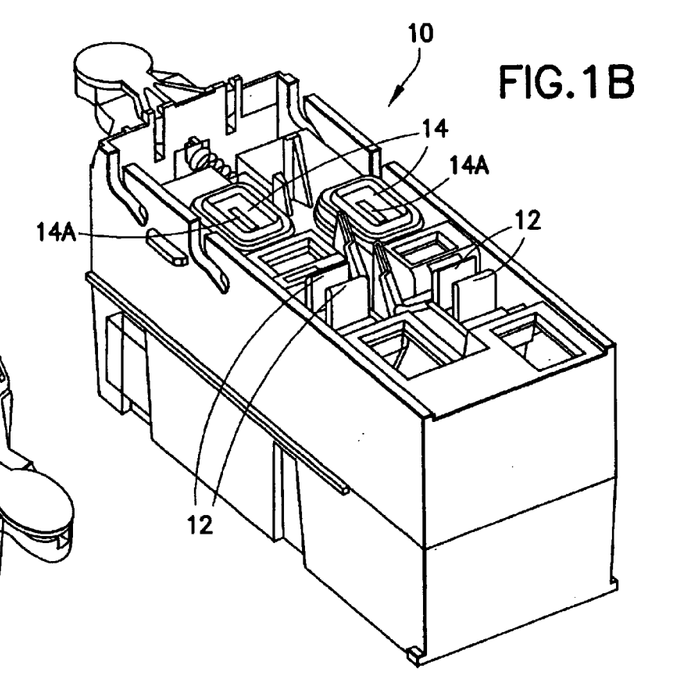

There is illustrated in FIGS. 1A and 1B a housing 10 for an inkjet printhead cleaning station. The inkjet printhead when used in a printing apparatus, such as an inkjet printer, a facsimile machine, a postage meter, etc. is normally positioned in a home position when printing is to occur. When a signal is received by the printing apparatus to print, the printhead is moved from the home position to a print position where the inkjet nozzles that are positioned in the printhead are exposed to place ink onto the recording medium, e.g. a recording medium in the form of an envelope which is printed on by a postage meter. After a certain amount of time, or at the end of a print cycle, the inkjet printhead returns to its home position. While returning to its home position, the printhead passes over a printhead cleaning i.e. housekeeping station 10 and is eventually parked over the cleaning station. As the inkjet printhead moves over the cleaning station there are several cleaning related functions that occur. There is the action of (1) spit pit, (2) wipe, (3) spit slit and (4) cap. In the spit pit area 11 ink is forced through the nozzle in the printhead.

The most frequent housekeeping or cleaning type of procedure is spitting. Therefore, the spit position needs to be as close as possible to the print position, so as not to lose too much time when spitting is required while printing. The ideal spit position would be right above the path of the material being printed on itself. However, in view of space related issues inside, for example, a letter transport system of a mailing machine, this is not always possible.

The spittoon has a second opening. In order to be able to spit between wiping by wiper blades 12 and capping at locations 14 (and also between uncapping and wiping) a second spit position is placed behind the wipers. It's a narrow opening about five mm wide. This spit slit is used to spit a few drops only e.g. about twenty per nozzle. Not all the nozzles in the printhead are fired at once but preferably in groups, starting at one end of the nozzle rows and moving towards the other end while the print heads are moved across.

The pigments of the ink tend to build up inside the spit pit. In order to prevent interference between ink build-ups and the print head, the ink build-ups should either be evened out periodically or the spittoon needs to be designed to be as deep as possible. The deeper the spittoon, the more ink can be spit into the spittoon before it needs replacing (should it ever raise this high). Since in the spit position space restrictions in the vertical direction are not so tight and for reasons of simplicity and cost, the latter option (that of a deep spittoon) would be preferably adopted.

Figure 1C:
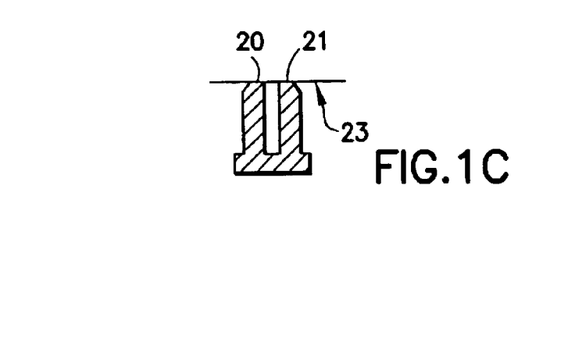
FIG. 1C is a front plan view of two wiper elements in the process of cleaning the surface of an inkjet printhead.
Figure 1D:
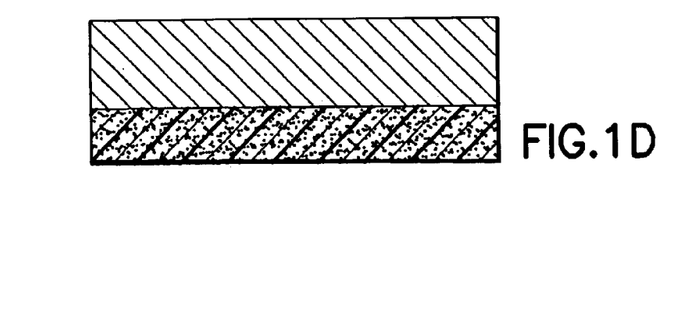
FIG. 1D is a plan sectional view of a spittoon with absorbent material.

It is recommended to insert approximately five to seven mm of absorbent material at the bottom of the spittoon (see FIG. 1D). The absorbent material is for example, a cellulose sponge material (this material is preferred over a synthetic foam material). The function of this absorbent material is to capture aerosol particles and ink drops generated when spitting. An open cell foam is preferably used.

Whenever the inkjet system is either turned off or in a non-printing state, the printhead cartridges are in the park position, where their nozzles are covered by a cap at the capping station 14. The cap should be compliant enough to form a seal at a minimal contact pressure on the nozzle plate. The capping force is usually about 0.5 kg and should preferably not exceed one kg of force.

An air chamber (not shown) in front of the nozzle plate must not be hermetically sealed. A vacuum or low-pressure situation in that chamber may cause ink to flow out of the printhead. A small hole (vent) 14A in the capping station serves as a pressure compensation channel. It also prevents pressure peaks when capping. Those pressure peaks could push air through the nozzles into the ink channels. The path from the printhead to the hole should preferably be as long and complicated as possible so that vapor diffusion stays at an acceptable level. To minimize the mass flux per time unit through the vent the ratio A/L (vent area/vent length) has to be minimized, without making it too narrow, so that plugs won't appear. The resulting compromise is a long and narrow design with a vent hole placed far from the pen. Typically A/L varies from 1 mm/50 to 1 mm/100.

The atmosphere in the air chamber should be kept humid. A sponge soaked with liquid (i.e. PEG) can be inserted into the capping station 14.

When sealing the pen's nozzle plate with the cap there should be no relative horizontal movement between cap and plate. A perpendicular approach of the two would be the most natural solution so as not to risk any damage of the nozzle plate with fine dust or the like. Since we are dealing with a horizontally moving print carriage and a fixed housekeeping station the simplest way to achieve minimum relative movement between cap and print head is to push the cap up a ramp with the print carriage while the latter is moving into the capping station. The caps are then automatically pushed up a ramp and against the pen's nozzle plate.

As shown in FIG. 1C a two bladed ink jet printhead wiper 20 and 21 is employed to wipe the outer surface of inkjet printhead 23.

The first blade 21 when slowly passing over a nozzle in the printhead, and due to its preferred rounded shape, wicks a small quantity of ink out of the nozzle for lubrication/wetting (loosening of debris which might otherwise scratch the surface). The second wiper 20 then wipes the nozzle plate with its preferred square edge and squeegees the surface. Using the above symmetric design, this slow wiping can be done either way. The wiper material chosen must, (a) not damage the nozzle plate, and (b) not change properties with prolonged exposure to ink.

Figure 2:
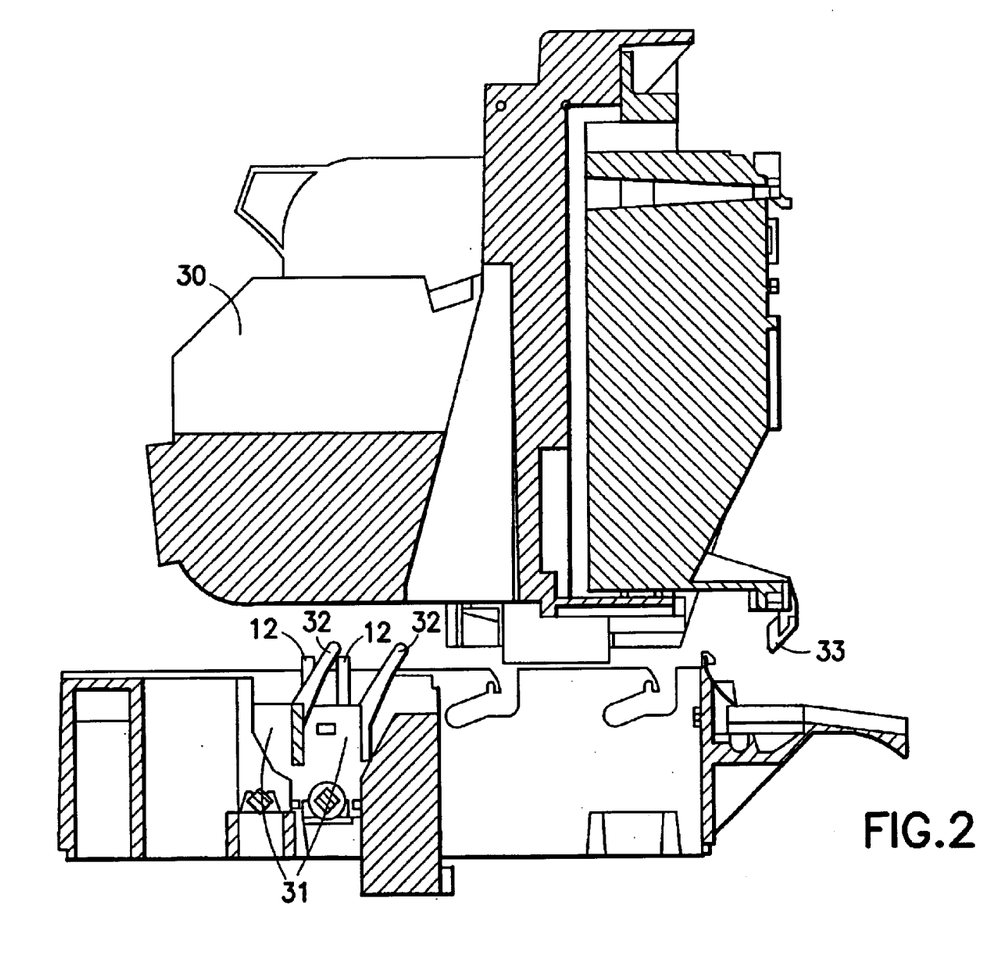
FIG. 2 is a sectional plan view of a wiping portion of an inkjet cleaning station in accordance with the features of the present invention illustrating the wipers in an idle position.

In accordance with the specific features of the present invention the wiper blades themselves must also be cleaned. This should preferably be done when the blades are still wet. As shown in FIG. 2, the wiper blades 12 in accordance with the present invention are mounted on a pivotable carriage assembly 31 with a spring-loaded axis and arms 32 projecting therefrom. The carriage that moves towards the printing position pushes a lever, the wipers rotate and are then bent by an edge of the housing of the housekeeping station. The ink on the wipers flicks off to the inside of the spittoon. As the carriage moves on, the levers are released and the springs set the wipers upright again.

Care has to be taken that the ink removed from the wipers does not soil the inside of the machine. An appropriate design of the flicking edges and the flicking process helps control the ink spread. A sharp edge is more efficient to remove ink from the wipers. A round "edge" (smooth transition) further away from the wipers spread less ink. In the wipe area 12, the nozzles are wiped. In the spit slit area 13 ink is again passed through the nozzles. In the cap area 14 the nozzles are sealed against the housing of the cleaning (housekeeping) station 10. This procedure keeps the nozzles in the ink jet printhead in good condition for the next printing cycle.

When the nozzles are out of the home position it may have a decap time of 30–120 seconds. The decap time is a time that the printhead is in the atmosphere without printing. Decap time is not an accumulation of the time, but a measurement of each amount of time there is not any printing being done. The ink jet head goes back its home station each time the decap time is reached. Furthermore, in accordance with the features of the present invention the entire housekeeping station 10 itself is kept in a stationary position in the system. Note that the entire housekeeping station can be removed from the system for cleaning or replacement.

In accordance with the features of the present inventor the housekeeping station 10 includes certain pivotable wiper blades 12 and, a process for cleaning the wiper blades 12 themselves. The wiper blades 12 are securely mounted on a carriage mechanism and in accordance with the specific features of the present invention) the carriage is pivotable (i.e. rotatable) and can move in a way such that wipers 12 rotate or are bent by an edge of the housing of the housekeeping station as explained in more detail hereinbelow. When the wipers are bent by an edge of the housekeeping station, ink on the wipers flicks off the wipers and travels to the inside of the opening 11. This procedure is done when the wipers 12 are still wet with ink.

The entire process for cleaning wipers used in an inkjet printhead housekeeping system after the wipers have done their job to clean the inkjet printhead is best illustrated in FIGS. 2 through 11 and as described hereinbelow.

As clearly shown in FIGS. 1A and 1B the housekeeping or cleaning station for use with an inkjet printhead includes a cap assembly 14 for both inkjet heads to be parked, and a double set of wipers 12.

FIG. 2 illustrates a side view of the wipers 12 when the printhead 30 is in the home position. Each of the wipers 12 are located on a carriage assembly 31 that can rotate (e.g. is pivotable) and the carriage assembly 31 also has arms 32 projecting from assembly 31. In FIG. 2 there is illustrated wipers 12 in a housekeeping station for an inkjet printhead 30 where the wipers 12 are in an idle position and the printhead is in a capped position. Also shown is hook element 33.

Figure 3:
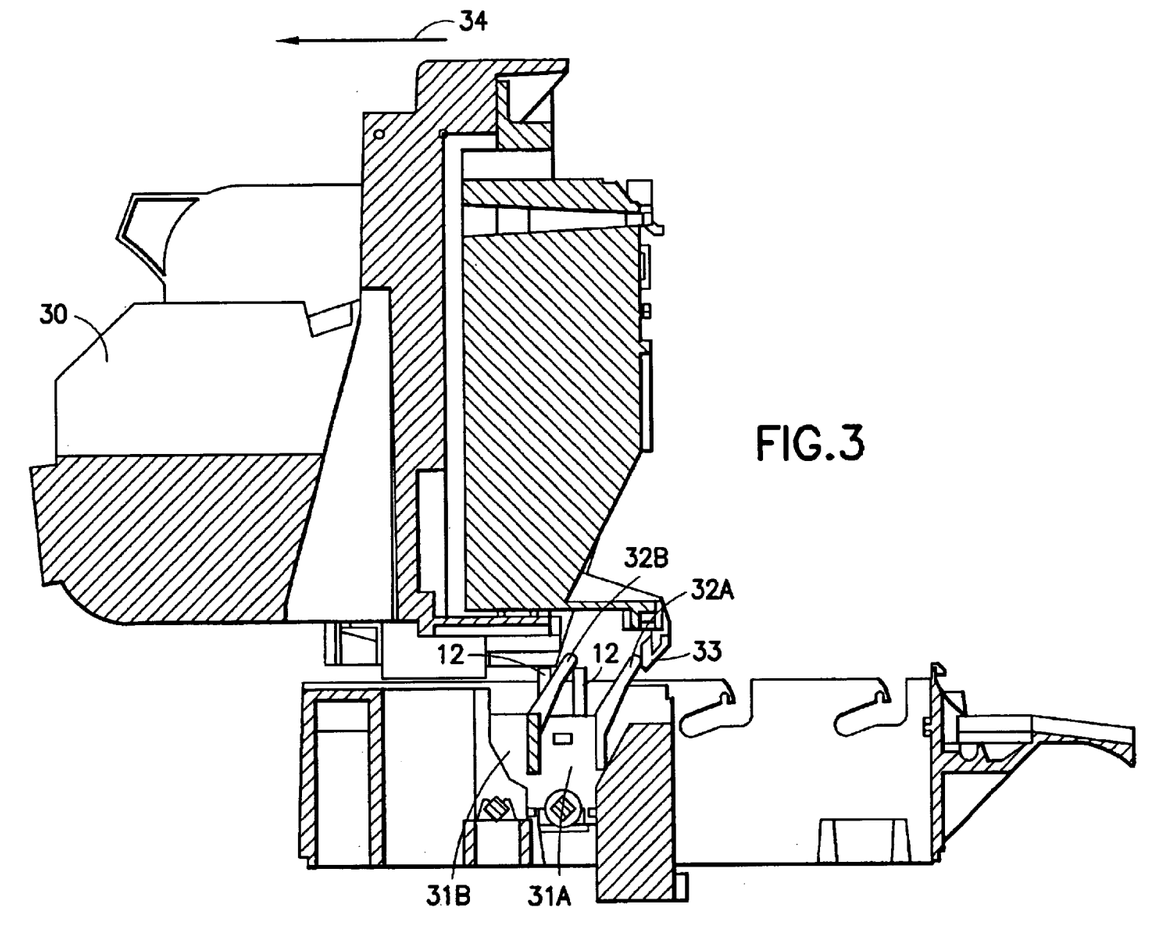
FIG. 3 is the first of a series of sectional plan views which illustrate the effect of a moving printhead assembly on a wiper portion of a inkjet cleaning station in accordance with the features of the present invention.

FIG. 3 illustrates when the printhead starts to move in the direction of arrow 34. FIG. 3 also illustrates a hook element 33 hooking onto the first arm 32A on printhead carriage assembly 31A. As the printhead 30 moves from the home position to the print position (i.e. in the direction of arrow 34) hook 33 engages the arms on the wiper carriage. As seen in FIGS. 3, 4, 5, 6, 7, 8 & 9, the hook first engages arm 32A and then arm 32B and brings the forward arm back against the other arm in a nested arrangement to rotate the pivotable carriages 31A and 31B and scrape the wipers 12 against an edge of the housekeeping mechanism housing.

Figure 4:
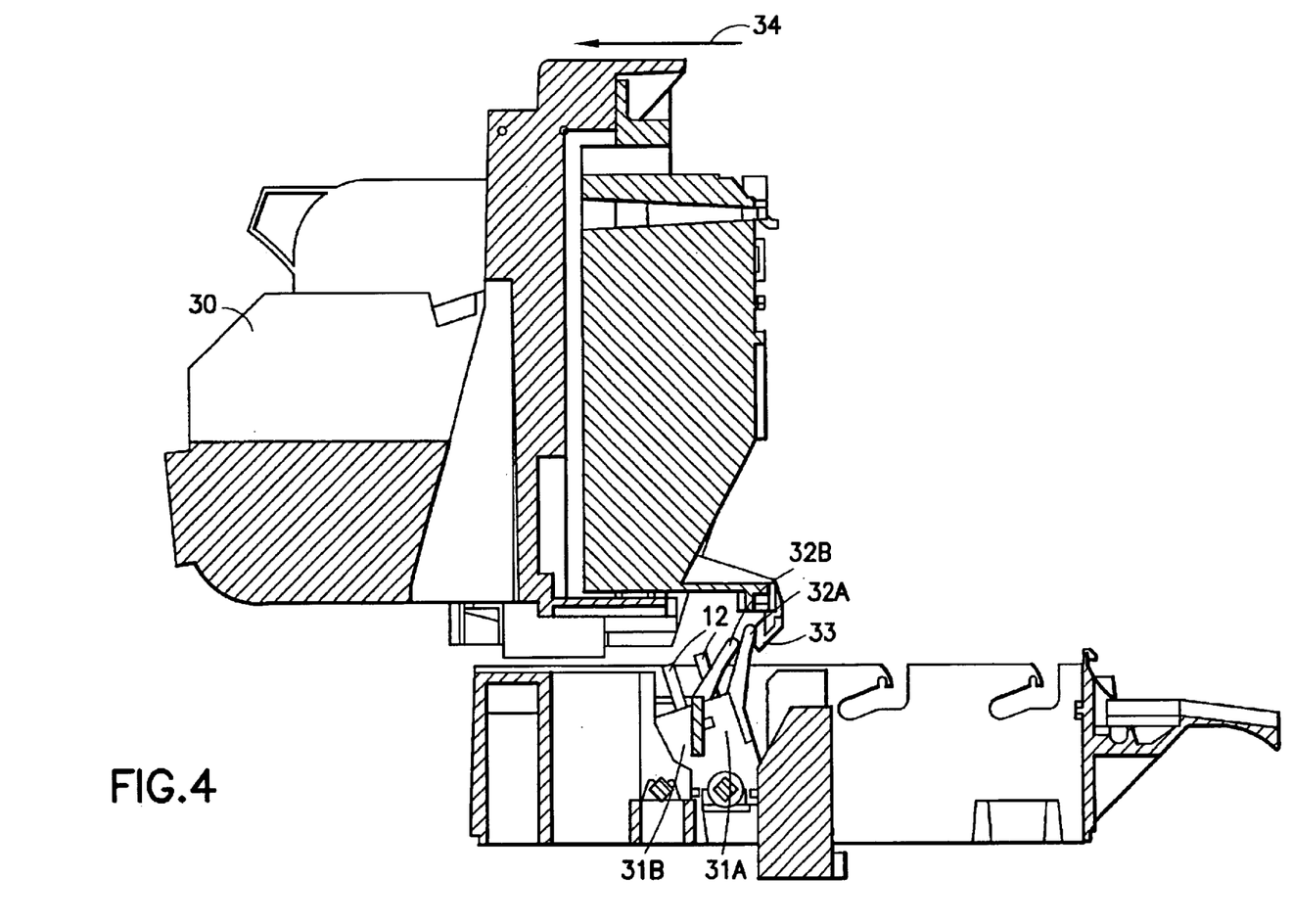
FIG. 4 is the second of a series of sectional plan views which illustrates the effect of a moving printhead assembly on a wiper portion of an inkjet cleaning station in accordance with the features of the present inventor.
Figure 5:
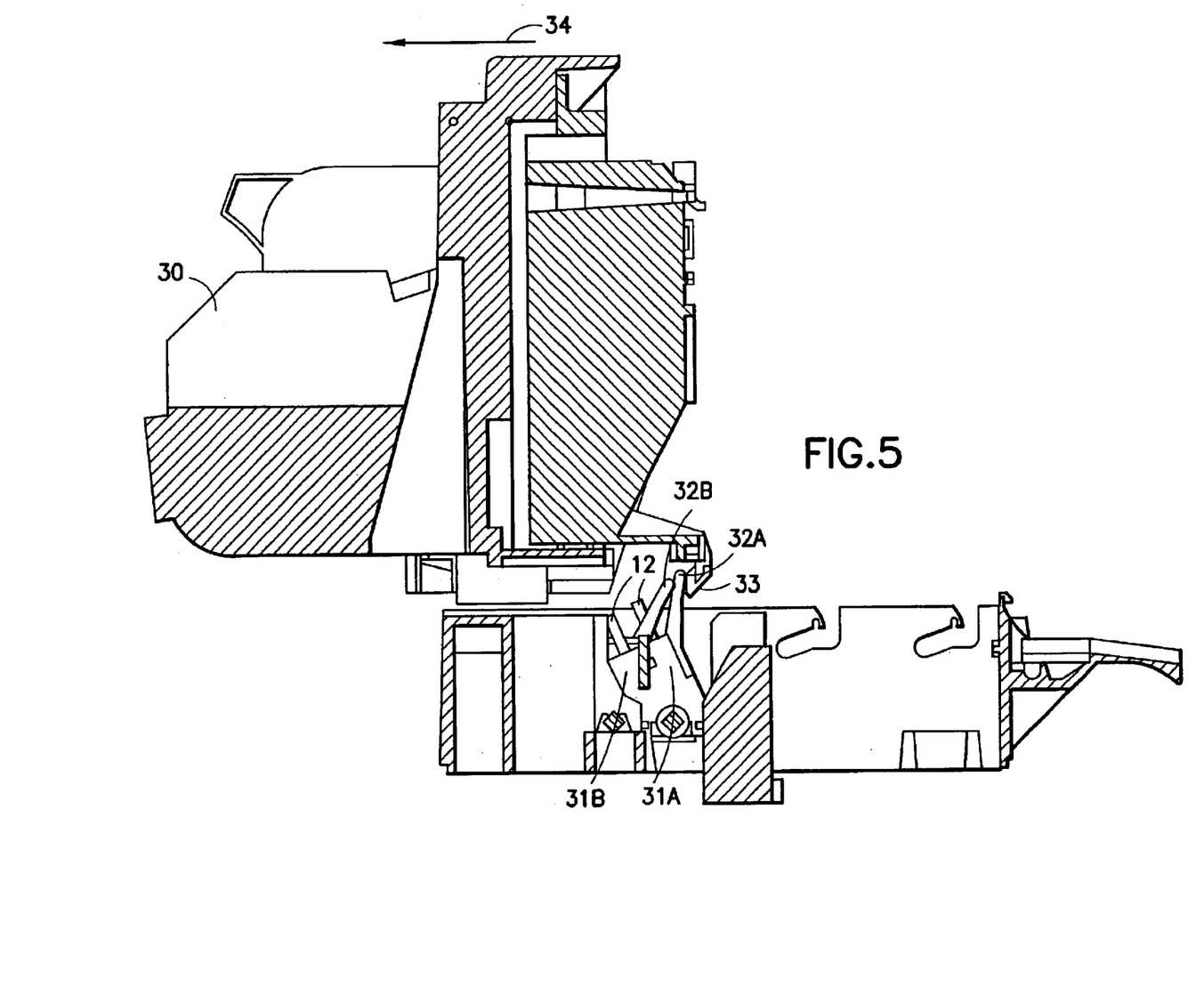
FIG. 5 is the third of a series of sectional plan views which illustrate the effect of a moving printhead assembly on a wiper portion of an inkjet cleaning station in accordance with the features of the present invention.
Figure 6:
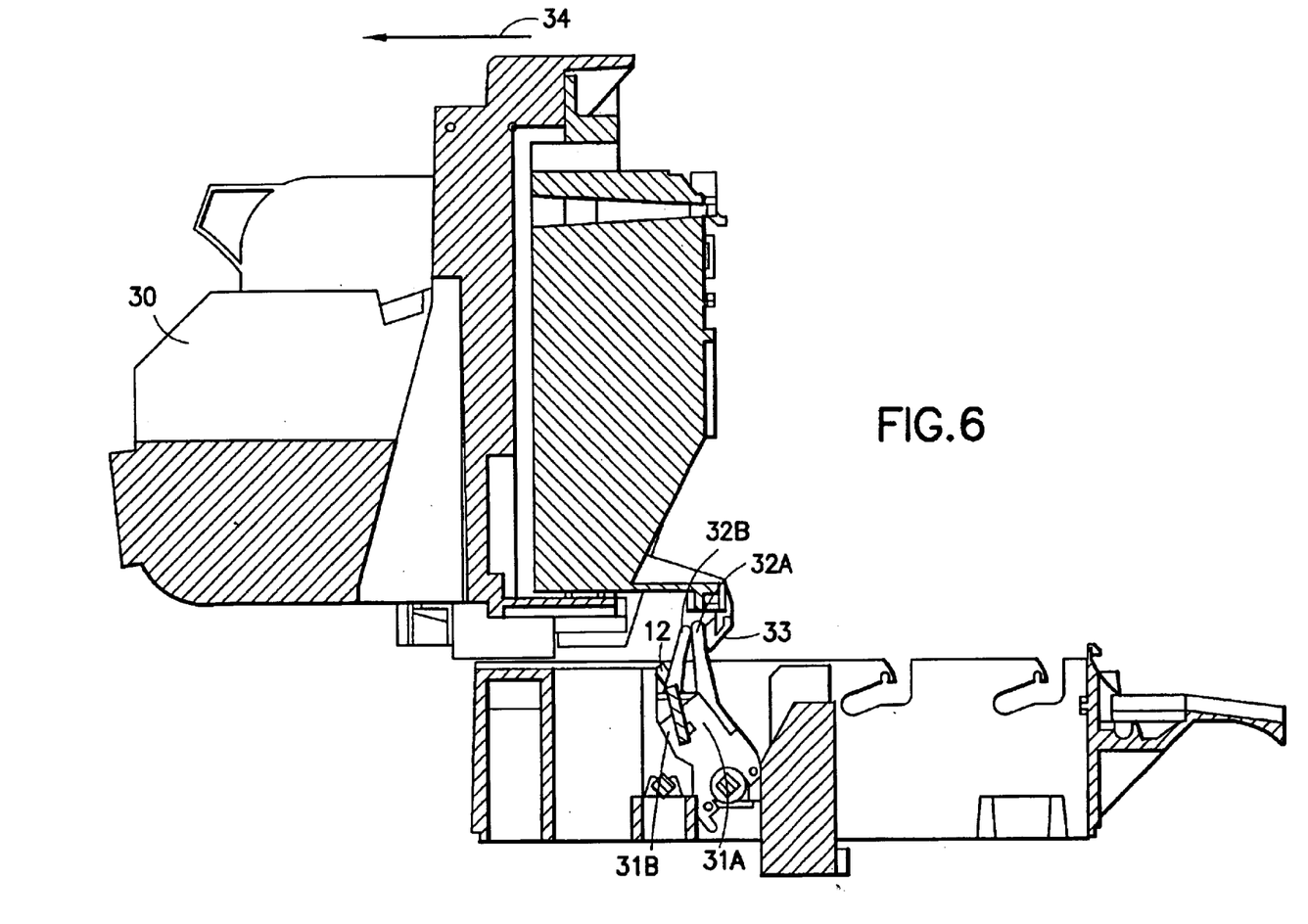
FIG. 6 is the forth of a series of sectional plan views which illustrate the effect of a moving printhead assembly on a wiper portion of a inkjet cleaning station in accordance with the features of the present invention.
Figure 8:
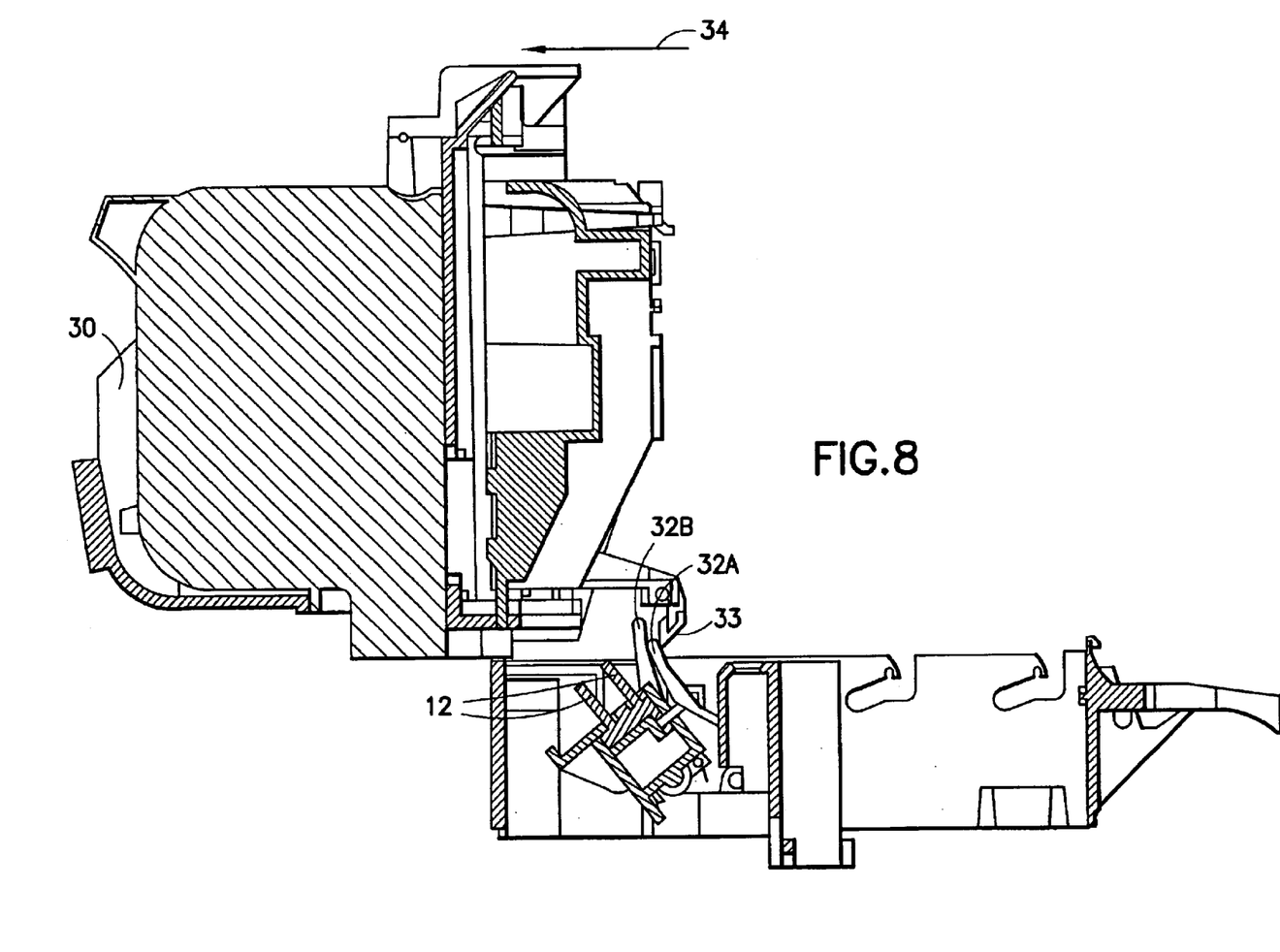
FIG. 8 is the sixth of a series of sectional plan views which illustrate the effect of a moving printhead assembly on a wiper portion of an inkjet cleaning station in accordance with the features of the present invention.

Specifically as illustrated in FIG. 3, hook 33 engages the first arm 32A on a pivotable carriage assembly that is secured to a first wiper 12. FIG. 4 illustrates the carriage assembly 31A rotating in the direction of arrow 35 due to the pulling force exerted by hook element 33 on arm 32A. FIG. 4 also illustrates the first arm 32A (which causes the first wiper to pivot) to touch the second arm 32B. FIG. 5 illustrates how the first of wipers 12 is bent against an edge 36 of the housing of the housekeeping (cleaning) system 37 thereby wiping ink off the wiper. FIG. 6 illustrates how as the printhead keeps moving in the direction of arrow 34, arm member 32A (which is being pushed by hooking element 33) now pushes against the second arm member 32B which pivots in the direction of arrow 35 and thereby bends the second wiper 12 against the edge 36 of housekeeping (cleaning) housing 37 thereby removing ink from the second wiper. FIGS. 2 and 8 illustrate that by the continued movement of the printhead assembly in the direction of arrow 34, the second set of wipers 12 located in the rear of the housekeeping system housing (see FIGS. 1A and 1B) are also rotated in the direction of arrow 35 due to the further pushing movement of hooking member 33 against arms 32A and 32B.

Figure 7:
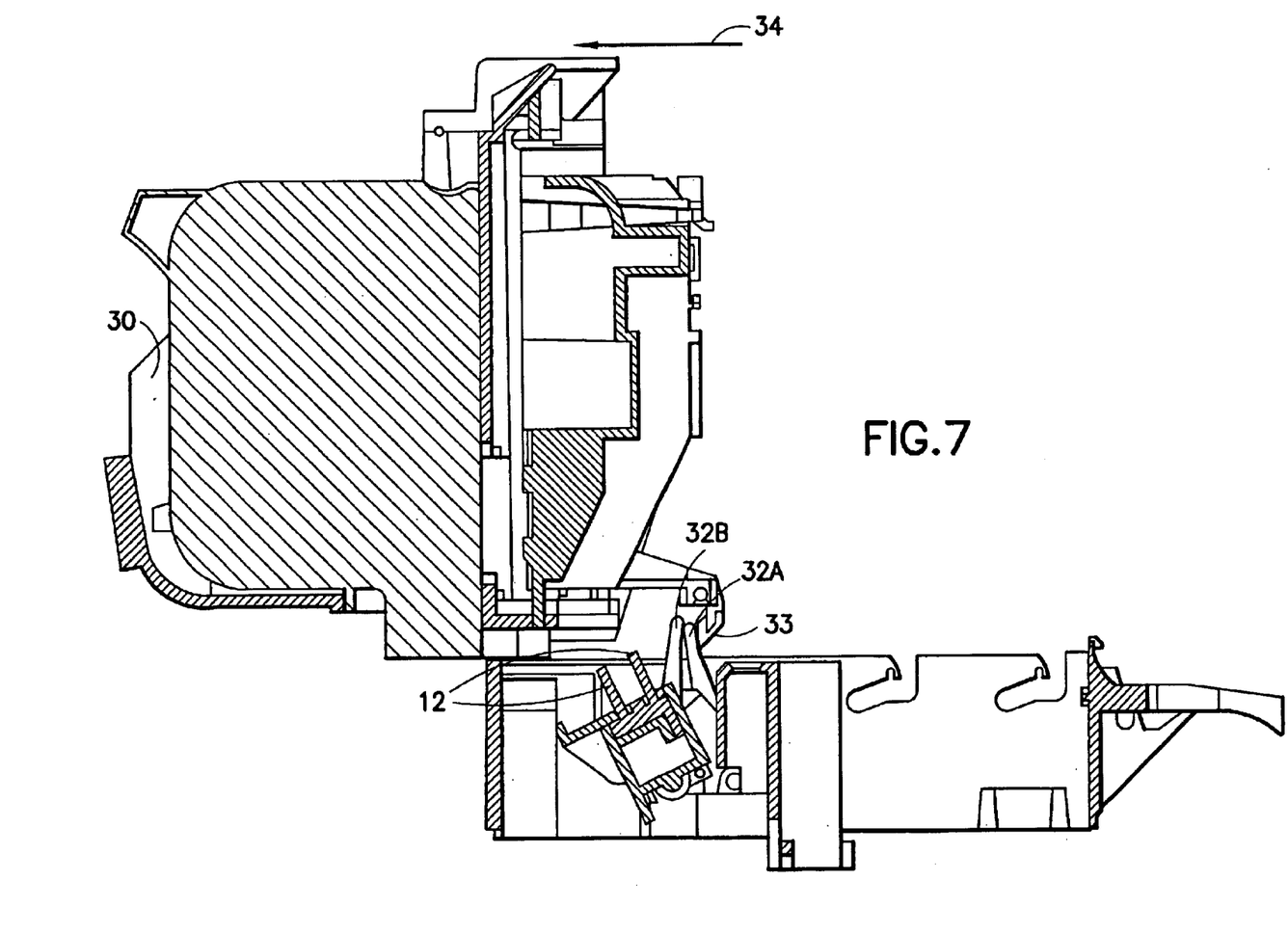
FIG. 7 is the fifth of a series of sectional plan views which illustrates the effect of a moving printhead assembly on a wiper portion of an inkjet cleaning station in accordance with the features of the present invention.
Figure 9:
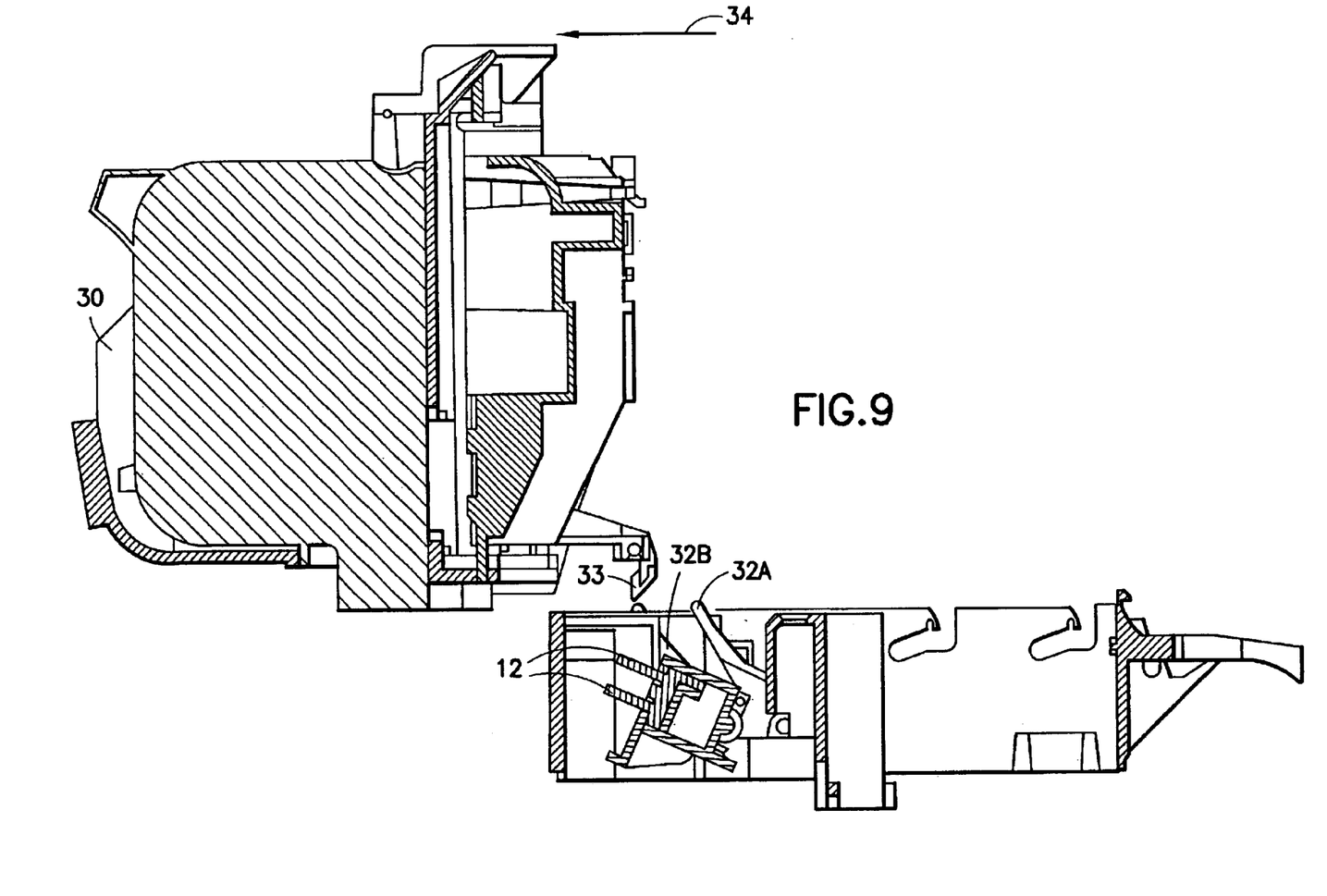
FIG. 9 is the seventh of a series of a sectional plan views which illustrate the effect of a moving printhead assembly on a wiper portion of an inkjet cleaning station in accordance with the features of the present invention.
Figure 10:
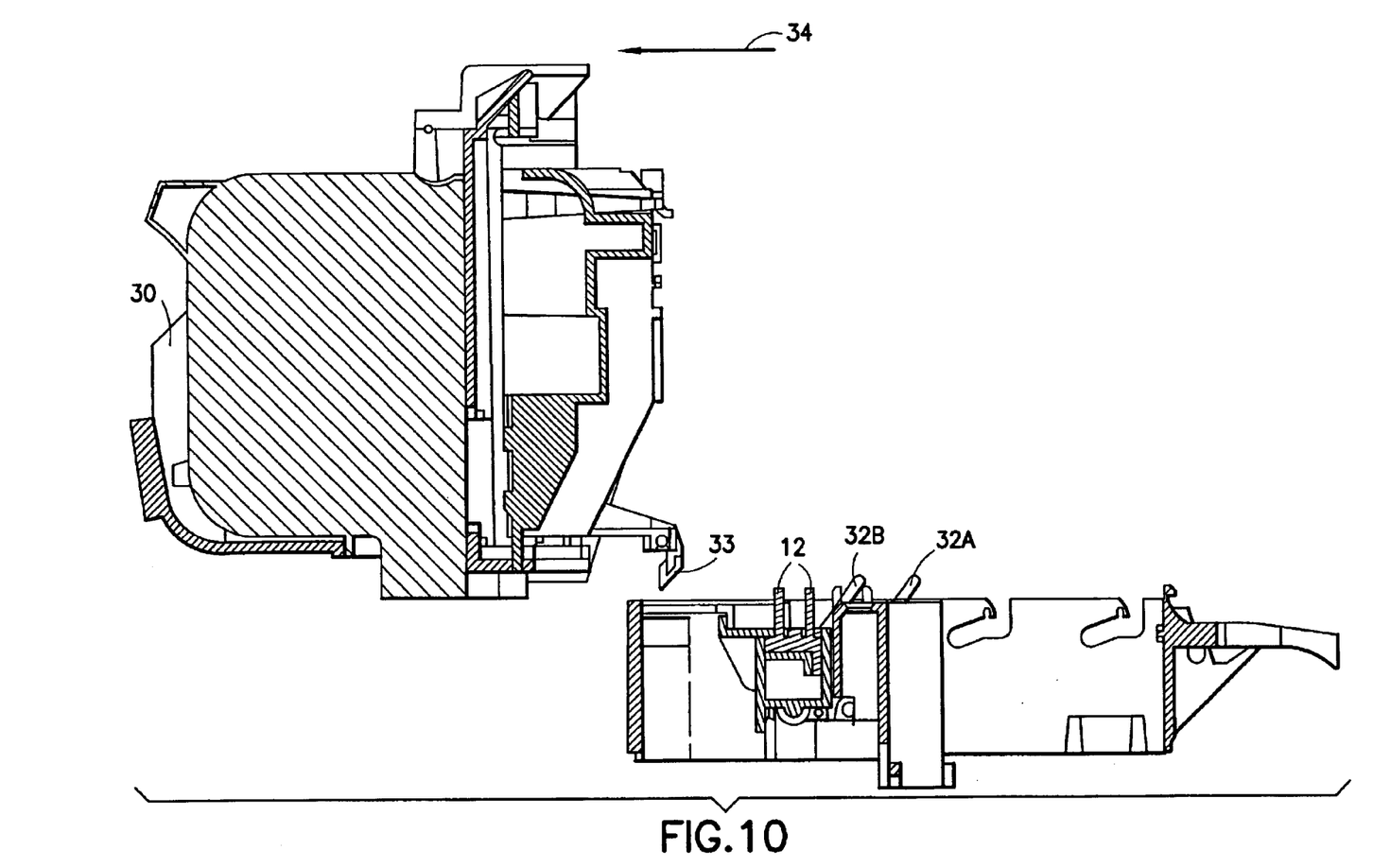
FIG. 10 is the eighth of a series of the sectional plan views which illustrate the effect of a moving printhead assembly on a wiper portion of an inkjet cleaning station in accordance with the features of the present invention.

In FIG. 7 the left wiper 12 is then scraped and, a little further along in the movement of the printhead, in FIG. 8, the right wiper 12 is scraped. In FIG. 9 the hook element 33 disengages with the wiper carriage arms 32A and 32B. In FIG. 10 the wiper carriage assembly (not shown) with arms 32A and 32B returns to their initial position to which they are biased.

Figure 11:
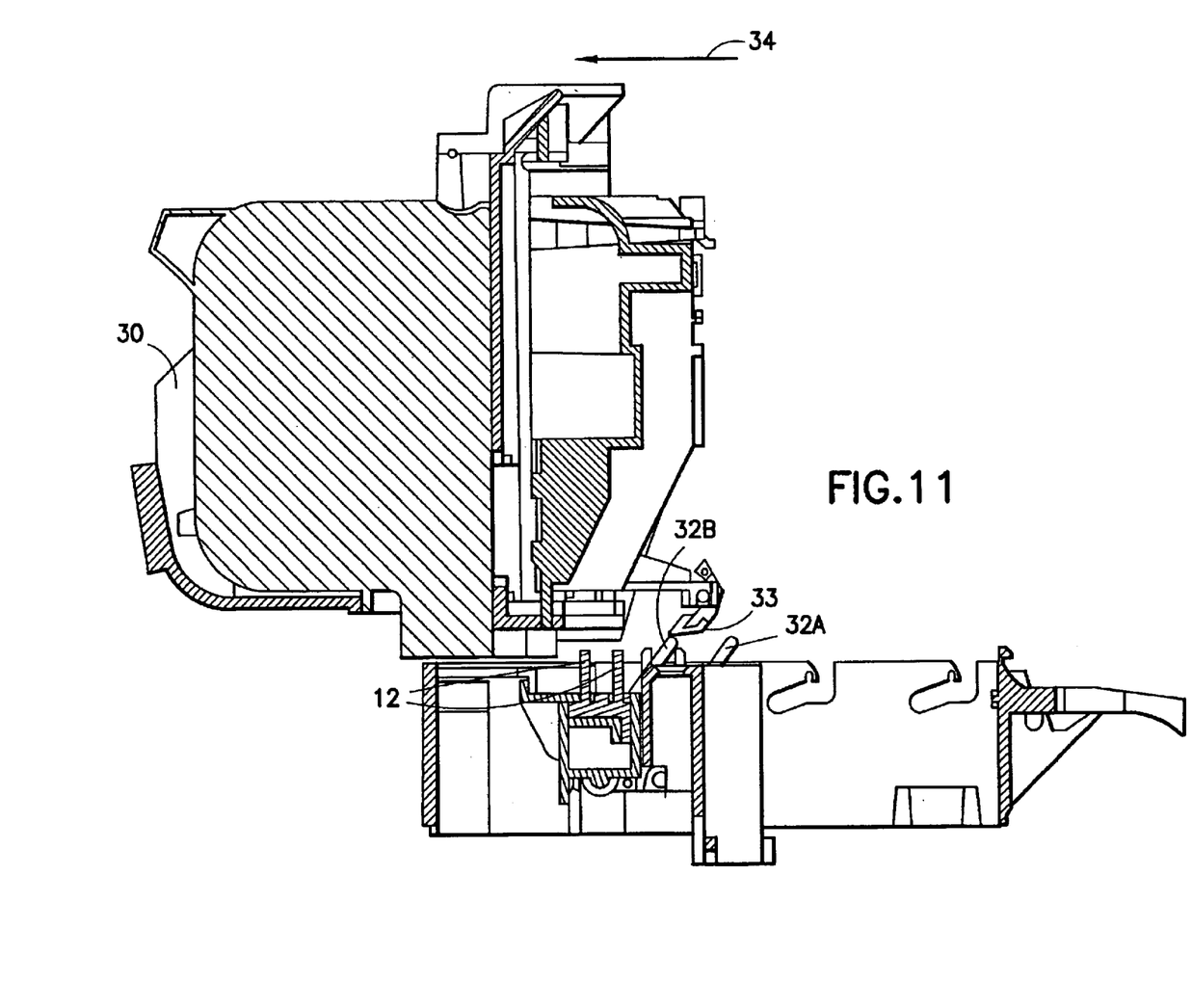
FIG. 11 is the ninth of a series of the sectional plan views which illustrates the effect of a moving printhead assembly on a wiper portion of an inkjet cleaning station in accordance with the features of the present invention.

FIG. 11 shows the printhead on its path from the print station to the home position. Moving in this direction the hook element 33 does not cause any action on the wiper carriage assembly. The hook 33 on the printhead 30 is biased so that as the printhead 30 returns to the home position the hook 33 bends back passed the wiper carriage arms 32A and 32B.

The wipers 12 get flexed in both directions as the wipers pass by the edge of the housing. The wiper carriage arms 32A and 32B are located close to one another so that as the hook 33 hits the first arm 32A, it in turn pushes against the second arm 32B and brings both wiper arms and the carriage back to the position where they are flexed against the edge of the housing of the housekeeping (cleaning) station.

While this invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An inkjet printhead cleaning station for cleaning a movable inkjet printhead assembly comprising:
    a housing structure for the cleaning station;
    a wiper element having a free end portion;
    a pivotable carriage assembly secured to the wiper element and adapted to rotate the wiper and thereby bend the free end portion of the wiper element; and
    a hook element positioned on the movable inkjet printhead assembly and adapted to engage the pivotable carriage and thereby rotate and bend the free end portion of the wiper against the housing thereby removing ink from the wiper.

2. An inkjet head cleaning station according to claim 1 wherein said cleaning station includes a plurality of wiper elements each being secured to a pivotable carriage assembly.

3. An inkjet head cleaning station according to claim 2 wherein each carriage assembly includes an arm member projecting therefrom, each arm member being adopted to engage said hook element and thereby rotate said wiper.

4. An inkjet printhead cleaning station comprising in a unitary housing structure:
    (a) a first area in which ink is adapted to be forced through nozzles positioned in the inkjet printhead;
    (b) a second area including a plurality of wipers adapted to wipe an inkjet head, each of the wipers being mounted on a carriage assembly that is adapted to pivot thereby rotating the wipers and causing edges of the wipers to bend on the housing and scrape off excess ink on the wipers;
    (c) a third area in which ink is forced through the nozzle for a second time; and
    (d) a forth area of the cleaning station in which a cap is positioned on the head to seal nozzles in the printhead.

5. A cleaning station for an inkjet printhead comprising:
    a first area in which ink is adapted to be forced through nozzles positioned in the inkjet printhead;
    a second area including:
        a plurality of wipers adapted to wipe an inkjet head; and
        a self cleaning mechanism for the plurality of wipers including a pivotable carriage assembly for rotating the wipers,
    wherein a hook element positioned on the inkjet printhead is operable to engage the pivotable carriage and thereby rotate and bend the plurality of wipers against a housing of the cleaning station to clean the wipers; and
    a third area in which ink is forced through the nozzle for a second time; and
    a forth area of the cleaning station in which a cap is positioned on the printhead to seal nozzles in the printhead.

6. A method for cleaning an inkjet printhead comprising:
    positioning the printhead in a first area of a cleaning station where ink is forced through nozzles of the printhead;
    positioning the printhead over a second area of the cleaning station where a plurality of wipers wipe the printhead;
    positioning the printhead over a third area of the cleaning station where ink is forced through the nozzles for a second time; and
    positioning the printhead over a forth area of the cleaning station where a cap is positioned on the printhead to seal the nozzles.

7. The method of claim 6, wherein positioning the printhead over the second area further comprises cleaning the plurality of wipers by rotating them against a housing of the cleaning station.

* * * * *